Sept. 17, 1935.  J. P. WATSON  2,014,825

STABILIZING MEANS FOR A BODY SUBJECTED TO THE INFLUENCE OF ANGULAR MOTION

Filed July 19, 1934  2 Sheets-Sheet 1

Inventor
John Percival Watson
By Pennie, Davis, Marvin & Edmonds
Attorneys

Sept. 17, 1935.  J. P. WATSON  2,014,825
STABILIZING MEANS FOR A BODY SUBJECTED TO THE INFLUENCE OF ANGULAR MOTION
Filed July 19, 1934  2 Sheets-Sheet 2
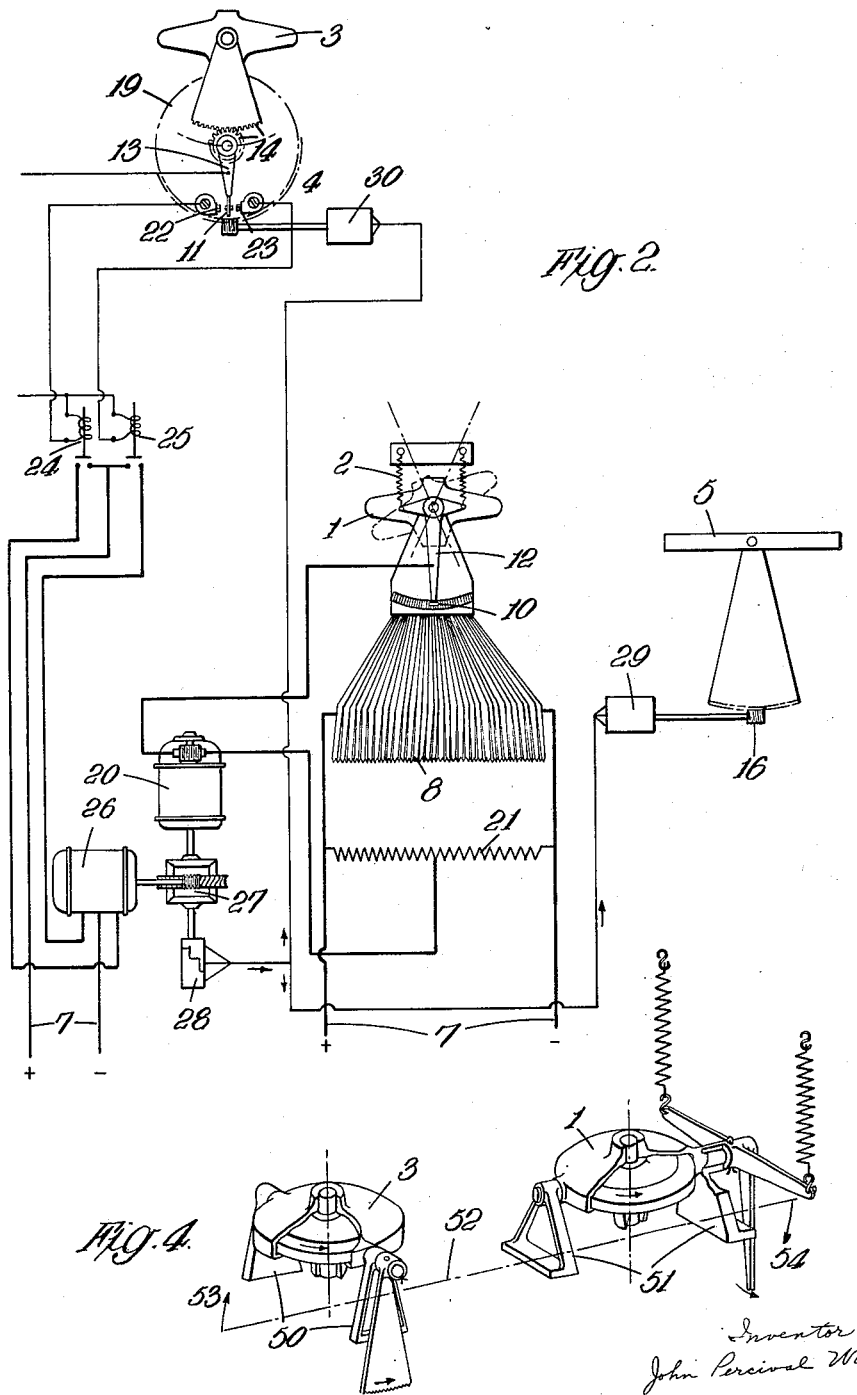

Patented Sept. 17, 1935

2,014,825

UNITED STATES PATENT OFFICE 2,014,825

STABILIZING MEANS FOR A BODY SUBJECTED TO THE INFLUENCE OF ANGULAR MOTION

John Percival Watson, Westminster, England, assignor to Vickers-Armstrongs Limited, Westminster, England, a British company Application July 19, 1934, Serial No. 736,133
In Great Britain August 2, 1933

9 Claims. (Cl. 172—239)

The present invention relates to the stabilization of a body subjected to the influence of periodic or irregular angular motion, such for example as the roll or pitch of a ship. In previous proposals having this end in view, gyroscopic or other form of control has been employed to control the body to be stabilized either directly or by some form of torque-amplifying gear. In such a system difficulty has been found in maintaining the required synchronism between the action of the gyroscope and that of the amplifying mechanism, and it is one of the main objects of the present invention to overcome this drawback.

According to the invention, mechanism for moving the body to be stabilized relatively to a second body subject to such angular motion is under the dual control of two gyroscopes or equivalent devices designed to produce controlling actions responsive respectively to the degree and to the rate of deviation from a mean position of the body subject to the motion. For the purpose of giving effect to the invention the means under dual control may be conveniently constituted by an electric or other motor, the controlling actions of the gyroscopes being transmitted thereto through the agency of electrical or mechanical means or by a combination of these agencies.

In order that the invention may be clearly understood and readily carried into effect, it will now be described more fully with reference to the accompanying diagrammatic drawings wherein:—

Figures 1, 2 and 3 illustrate three ways of carrying the invention into effect;

Figure 4 shows the gyroscopes of Figures 1, 2 and 3 in perspective and the plane of movement of the body to be stabilized.

Figure 1:
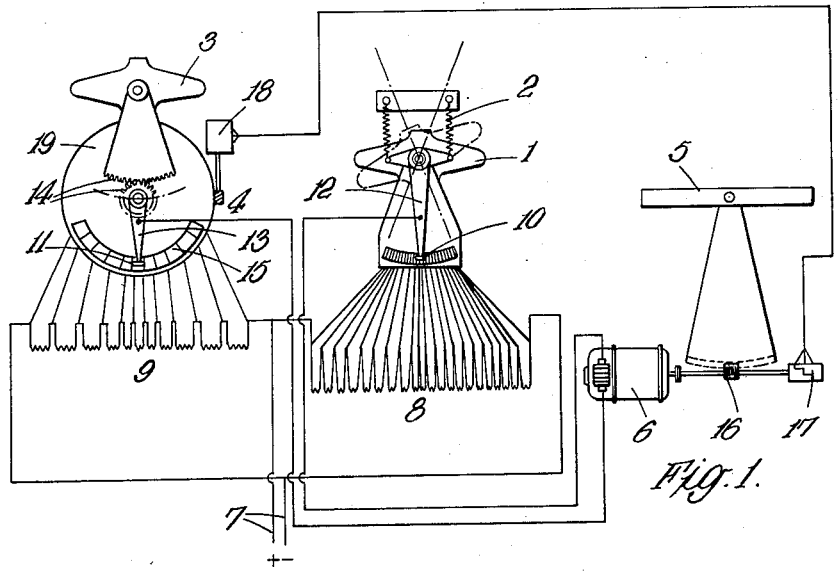

In Figures 1 to 4 a rocking frame or the like 1 associated with the gyroscope affording control in accordance with the rate of deviation is restrained by springs 2, whereof one end of each is attached to the oscillating body, so that movement of the gyro axis from a given position is constrained resulting in precessional movement. The other gyroscope is unconstrained, so that a frame 3 associated with it is not provided with springs. With the latter gyroscope there is associated a follow-up mechanism 4 actuated in accordance with the controlled movement, such follow-up mechanism being provided for the purpose of ensuring that, so long as the controlled movement is such as to counteract the effect of the motion of the body 5 to be stabilized, the action of the gyroscope associated with the frame 3 is neutralized, control being effected solely by the constrained gyroscope.

In order to stabilize the body liable to be influenced by angular motion in more than one plane, a system for each plane, such as above set forth, is necessary, the planes of operation being at an angle the one to the other. Considering, however, one of said systems only, the body 5 as represented in each of the figures of the drawings to be stabilized is mounted so as to be free to oscillate in a given plane, such oscillation being effected in accordance with the dual control.

In the system of control illustrated in Figure 1, the stabilizing motor is constituted as a reversible electric motor 6 connected to the power mains 7 through two potentiometers 8 and 9, the positions of the sliding contacts 10 and 11 in which are respectively under the control of the gyroscopes. For this purpose the slider 10 is carried by an arm 12 fixed on the pivot of the frame 1 and the slider 11 by an arm 13 adapted to be rocked from the frame 3 by rack-and-pinion mechanism 14. If the body subject to angular motion, is at any time not executing such motion, for example, in the case of a ship, if there be no roll, the arrangement is such that the sliders respectively occupy such positions on the potentiometers, that no electro-motive force is applied to the terminals of the motor 6, which accordingly effects no movements of the body 5 to be stabilized. On the body subject to angular motion executing such a motion, however, this state of equilibrium is upset and the motor 6 accordingly rotates first in one direction and then in the other in order to impart corresponding counteracting motion to the body 5. The follow-up mechanism 4 operates to move the contacts 15 of the potentiometer 9 relatively to the slider 11, and, as such follow-up mechanism is operated in accordance with the movement of the stabilizing motor 6, so long as the action of the latter under the control of the constrained gyroscope is such as to give the required counteracting motion to the body 5, the follow-up mechanism is effective to maintain the slider 11, in its mean position relatively to its co-operating contacts 15, so that the E. M. F. applied is determined solely by the controlling action of the constrained gyroscope. The motor 6 transmits its rotary movement to the body 5 through a worm and worm-wheel 16, and to the follow-up mechanism 4 by means of an electrical transmitter 17 adapted to actuate a step-by-step motor 18 geared to a disc 19 on which the contacts 15 are mounted. Obviously more than one body 5 might be stabilized from a single motor 6.

In the modified system depicted in Figure 2, the action of the constrained gyroscope is transmitted by means of a potentiometer 8 as before, such action serving to control a reversible electric motor 20, connected across the slider 10 and an intermediate point of a resistance 21 placed across the mains 7. In the case of the unconstrained gyroscope, however, the contact 11 on the arm 13 is adapted to bear alternatively on two contacts 22 and 23 mounted on the disc 19 actuated by the follow-up mechanism 4, such alternative contact serving, through relays 24 and 25, to determine the direction of rotation of a second electric motor 26; on the other hand, if the contact 11 bears on neither of the contacts 22 or 23, the motor 26 is disconnected from the mains. The motions of the two eletcric motors 20 and 26 are combined by means of differential gearing 27 to actuate an electrical transmitter 28 serving to actuate a step-by-step motor 29 by which the stabilizing effect is secured and also a step-by-step motor 30 which drives the follow-up mechaniasm 4.

Figure 3:
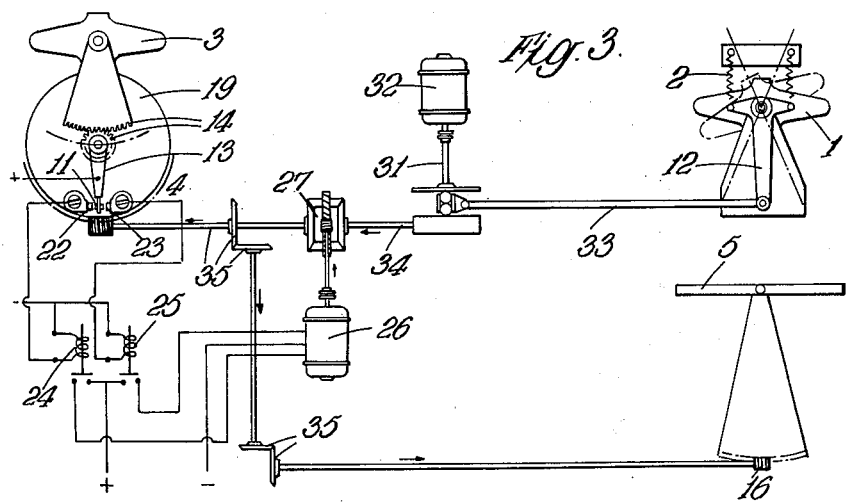

In the further modification illustrated in Figure 3, the arrangements for transmitting control from the unconstrained gyroscope are similar to those in the system described with reference to Figure 2, but mechanical means is employed for transmitting control from the constrained gyroscope. Such mechanical means is constituted by a variable speed reversible mechanism 31, such as parts 41 and 42, U. S. Patent No. 1,493,095, adapted to transmit rotary motion from the constant-speed motor 32 at a speed and in a direction determined by the constrained gyroscope; for this purpose the arm 12 of the rocking frame I is connected by a rod 33 with the controlling element of the variable speed mechanism 31, the driven shaft 34 serving to transmit rotation to the differential gearing 27. Such differential gearing might operate through a transmitter and step-by-step motors as above, but Figure 3 shows how its movement may be transmitted directly to the body 5 and to the follow-up mechanism 4 by mechanical means comprising suitable spindles and gearing 35.

The frames 3 and I shown in Figure 4 are carried by bearing standards 50, 51, respectively which may be bolted to the deck of a ship or to any other body subject to the motion in the plane indicated by the broken line 52 and arrows 53, 54.

It will be realized that the system broadly is susceptible of many modifications and combinations of various means for transmitting the controlling actions of the gyroscopes to the stabilizing motor or its equivalent and also from the latter to the body to be stabilized.

Figure 5:
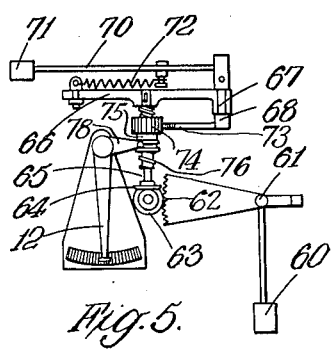
Figures 5 and 6 illustrate pendulum devices intended to be substituted for the gyroscopes indicated in the other figures.

The pendulum arrangement shown in Figure 5 is intended to be substituted for any of the constrained gyroscope devices shown in the preceding figures. In this arrangement a pendulum 60 swings about a pivot 61 in accordance with the angular movements. The movements of the pendulum are transmitted through a toothed quadrant 62, bevel wheels 63, 64, shaft 65, to a disc 66 that carries a rotatable pivot pin 67 in a bearing 68. An arm 70 is mounted at one end of the pivot pin 67 and carries a weight 71 at its free end and is controlled by a spring 72 attached to the wheel 66 and to the arm 70. The lower end of the pivot pin is connected through a toothed quadrant 73, pinion 74, sleeve 75 having threaded engagement with screw 76 on shaft 65, and lever 78, with the arm 12. Movements of the pendulum are thus transmitted to the arm 70 and the centrifugal force of this arm is proportional to the speed of the disc 66 and therefore is also proportional to the rate of movement of the body. The movements of the arm 70 are transmitted to the arm 12 and the remaining operation is as hereinbefore described.

Figure 6:
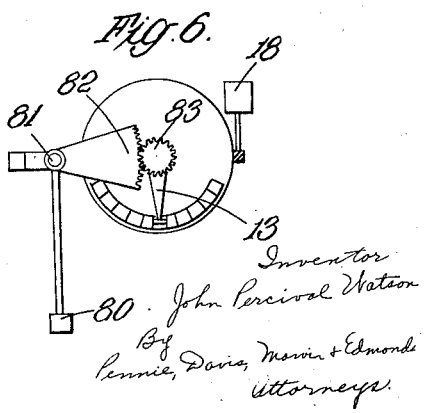

The pendulum arrangement shown in Figure 6 is intended to be substituted for any of the unconstrained gyroscope devices shown in Figures 1 to 4. In this arrangement the pendulum 80 swings about a pivot 81 and its movement is transmitted by toothed quadrant 82 and pinion 83 to the arm 13 which operates as hereinbefore described.

It is to be understood that the apparatus may comprise two gyroscopes, two pendulums, or one gyroscope and one pendulum, and in the latter case the constrained or unconstrained gyroscope will be used with the pendulum of Figure 5 or of Figure 6 respectively.

What I claim and desire to secure by Letters Patent of the United States is:—

1. Means for stabilizing a body subject to the influence of periodic or irregular angular motion, comprising two stabilizing devices for producing movements in accordance with the degree and rate of said motion respectively, one of them being "main" to the other, means for transmitting the movements of the main one of said devices to said body in the direction to stabilize said body, a difference-detecting device for detecting the occurrence of a difference between movements applied to it, means for transmitting the total stabilizing movements applied to said body also to the said difference-detecting device, means for transmitting the movements of the other stabilizing device to said difference-detecting device, and means controlled by the difference-detecting device for transmitting correctional stabilizing movements to said body when the total stabilizing movements applied to said body differ from the movements of said other stabilizing device.

2. Means as in claim 1 wherein said other stabilizing device is the one which is responsive to the degree of said motion.

3. Means for stabilizing a body as in claim 1, and having a potentiometer associated with said main stabilizing device, another potentiometer associated with said difference-detecting device, a reversible motor, connections between the potentiometers, connections from the potentiometers to the reversible motor, and means for transmitting the motion of the reversible motor both to the body to be stabilized and to the difference detecting device, the arrangement being such that current controlled from the first-mentioned potentiometer controls the reversible motor alone unless the difference-detecting device detects a difference between said movements whereupon the other potentiometer varies the current supply to the reversible motor to correct its movement.

4. Means as in claim 1 and having a reversible motor, means for supplying current to the reversible motor under the control of said main stabilizing device, a second reversible motor, means including forward driving and reverse driving circuits for supplying current to said second reversible motor, making and breaking devices in said circuits, means for controlling said making and breaking devices from the difference detecting device, means for differentially combining the movements of the two reversible motors, and means for applying the combined movements both to the body to be stabilized and to the difference detecting device.

5. Means as in claim 1 wherein there is provided a mechanical variable speed gear having an adjustable element which is actuated from the main stabilizing device, and means for transmitting movement from said gear both to the body to be stabilized and to said difference detecting device.

6. Means as in claim 1 wherein the main stabilizing device comprises a pendulum, a weighted member actuated from the movement of the pendulum, means for deriving movement from the weighted member in proportion to the centrifugal force of the weighted member, and means for transmitting the derived movement both to the body to be stabilized and to the difference detecting device.

7. Means for stabilizing a body subject to the influence of periodic or irregular motion in relation to a second body subject to the same motion, comprising two stabilizing devices which derive movements from the second body in accordance with the degree and rate of said motion respectively without affecting the motion of said second body, means for transmitting the movements of the main one of said devices to the first mentioned body in the direction to stabilize said body, a difference detecting device for detecting when a difference occurs between movements applied to it, means for transmitting the total stabilizing movements applied to the first mentioned body to the said difference detecting device, means for transmitting the movements of the other stabilizing device to said difference detecting device, and means controlled by the difference detecting device for transmitting correctional stabilizing movements to said first mentioned body when the total stabilizing movements applied to said first mentioned body differ from the movements of said other stabilizing device.

8. Apparatus as in claim 7 wherein the difference detecting device comprises a movable member actuated by one of the stabilizing devices in accordance with said motion, a second movable member, means for transmitting the total stabilizing movements imparted to the first mentioned body also to the said second member, and means receiving movement when the two members are not operating in unison and transmitting this movement to the first mentioned body as a correctional movement.

9. Means for stabilizing a body subject to the influence of periodic or irregular angular motion, comprising two stabilizing devices which produce movements in accordance with the degree and rate of said motion respectively, means for transmitting movements from one of said devices to the body to be stabilized, a movable member actuated by the other stabilizing device, a second movable member, means for transmitting the total stabilizing movements applied to the first mentioned body also to the said second movable member, and means receiving movement when said members are not operating in unison and imparting such movement to the first mentioned body as a correctional movement.

JOHN PERCIVAL WATSON.